United States Patent [19]

Mattson et al.

[11] 4,387,852
[45] Jun. 14, 1983

[54] FERTILIZER SPREADER

[75] Inventors: Charles A. Mattson, Woodland Hills; James Michel, Agoura; Anthony Domagalski, Moorpark, all of Calif.

[73] Assignee: Allegretti & Co., Chatsworth, Calif.

[21] Appl. No.: 301,404

[22] Filed: Sep. 11, 1981

[51] Int. Cl.³ .............................................. B05B 11/06

[52] U.S. Cl. .................................... 239/143; 239/365; 222/630; 406/38; 406/138; 406/153

[58] Field of Search ............... 239/143, 153, 289, 651, 239/653, 654, 655, 689; 406/38, 138, 144, 142, 406/153; 222/175, 630, 637; 366/101, 150

[56] References Cited

U.S. PATENT DOCUMENTS

| | | | |
|---|---|---|---|
| 676,204 | 6/1901 | Rippley | 239/153 X |
| 803,661 | 11/1905 | Brandt | 239/153 |
| 2,343,163 | 2/1944 | Vose | 406/144 X |
| 2,723,781 | 11/1955 | Funke | 222/175 |
| 2,842,465 | 7/1958 | Harrison | 366/101 X |
| 3,188,146 | 6/1965 | Cordes | 222/630 |

*Primary Examiner*—John J. Love
*Assistant Examiner*—Mary McCarthy
*Attorney, Agent, or Firm*—Fulwider, Patton, Rieber, Lee & Utecht

[57] ABSTRACT

A fertilizer spreader includes an attachment assembly for use with a portable hand-held air blower for entraining granular fertilizer or the like into the discharge air stream of the blower, whereby the fertilizer is broadcast by the air stream over a lawn or garden area. The attachment assembly comprises an adapter nozzle connected in-line with the discharge air stream of the blower and including a pressure port through which a portion of the discharge air stream is directed for passage through a pressure tube to a diffuser mounted within a portable fertilizer-receiving container near the bottom thereof. The diffuser turns the air stream upwardly within the container and divides the stream into a plurality of turbulent air flows for agitating and suspending particles in a localized region above the diffuser. These suspended fertilizer particles are drawn into a downwardly open suction tube which is connected back to the adapter nozzle at a Venturi throat therein to provide a vacuum source for drawing the fertilizer particles into the blower discharge air stream for entrainment therewith. A bleed hole in the suction tube is partially closed by an adjustment collar to select the magnitude of the vacuum acting upon the suspended fertilizer particles for controlling the flow rate of particles into the blower discharge air stream.

39 Claims, 9 Drawing Figures

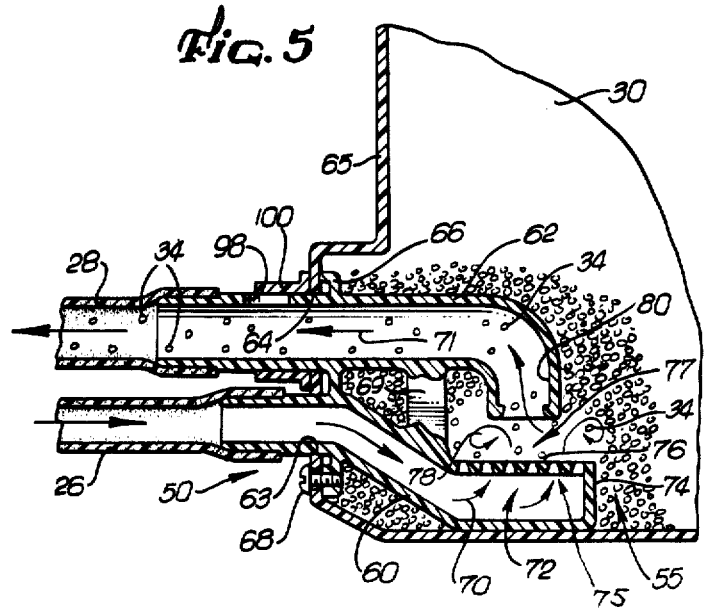
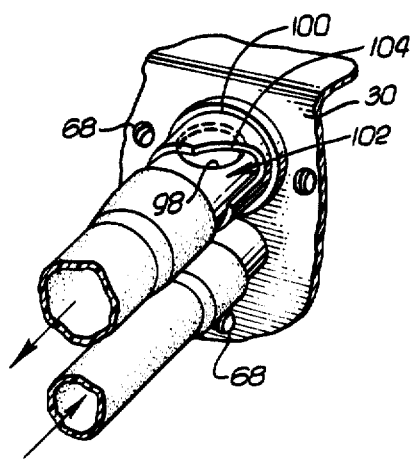
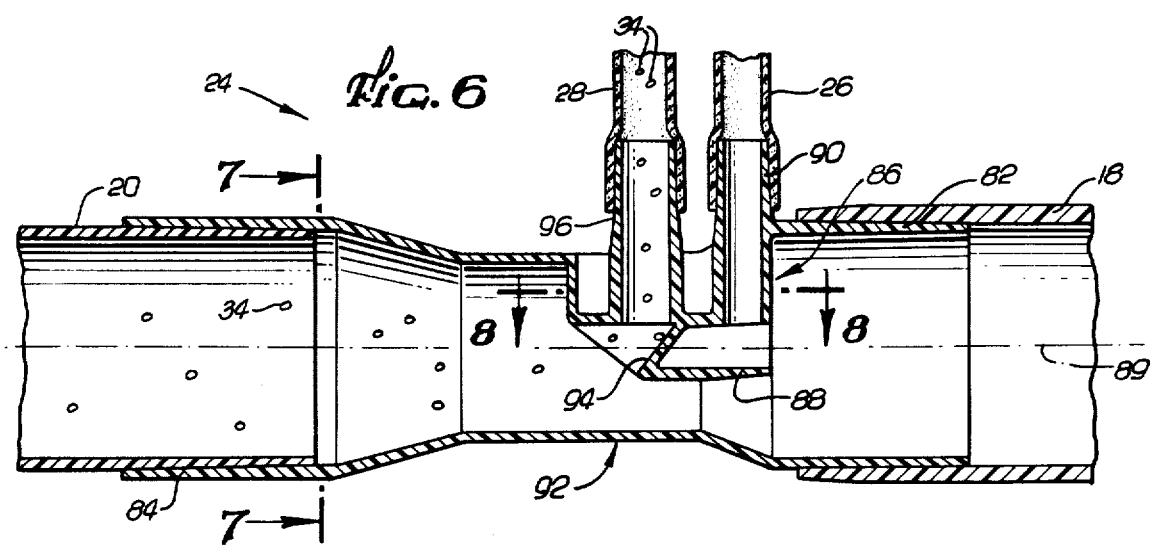
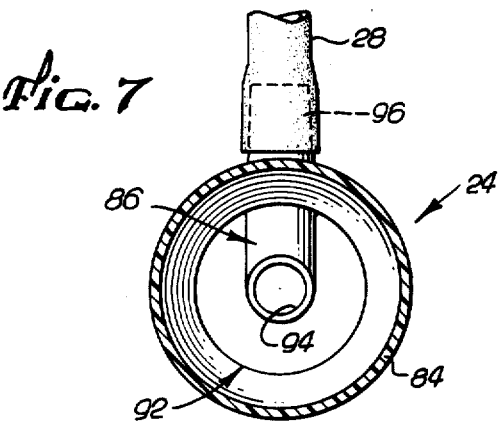
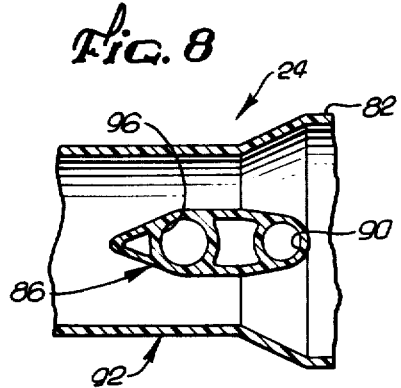

FERTILIZER SPREADER

BACKGROUND OF THE INVENTION

This invention relates in general to apparatus and methods for broadcasting particulate materials such as fertilizers over a prescribed area of a lawn, garden, or the like. More specifically, this invention relates to a fertilizer spreader in the form of an attachment assembly for use with a hand-held portable air blower to permit broadcasting of granular fertilizer or the like by use of the discharge air stream of the blower.

Hand-held portable air blowers in general are known in the art, and typically comprise a relatively lightweight housing in which is mounted an impeller for drawing air into the housing and for expelling that air through a discharge outlet at a relatively high flow rate. The impeller may be driven in any suitable manner, such as by use of an electric or gasoline motor, to provide the discharge air stream for use, for example, in blowing leaves or dirt from grass or pavement areas.

A variety of attachment kits and assemblies have been proposed for use with portable hand-held air blowers to increase the utility of such blowers by permitting the discharge air stream to be used for a variety of purposes. For example, attachment kits have been proposed for permitting selected operation of the blower in a vacuum mode, such as that shown and described in copending and commonly assigned U.S. Pat. No. 4,325,163. Alternatively, attachment kits have been proposed which permit use of the blower in cleaning leaves and other debris from rain gutters, such as that shown and described in copending and commonly assigned U.S. application Ser. No. 296,428.

Kits and devices have also been proposed for utilizing and relatively high velocity air stream of the blower to entrain and blow a particulate substance over a prescribed area. See, for example, U.S. Pat. No. 4,256,241. However, in the context of small portable air blowers of the type generally analogous to commercially available portable blowers for domestic lawn and garden use, these kits and devices have been intended primarily for use with relatively fine particulate substances of a dust-like composition such as many common pesticides. These prior art devices have not been well suited for entraining and blowing coarser particulate substances, such as granular fertilizers of the type and size typically used for domestic lawn and garden applications, primarily as a result of difficulties in obtaining uniform particle flow rates without clogging. Moreover, these devices have not provided satisfactory adjustment means to permit significant adjustment of particle flow rate or to allow use with particles having different sizes ranging from fine powders to coarser granules. Accordingly, fertilizers continue to be applied by use of conventional fertilizer spreaders which must be walked back and forth many times over a lawn or garden area to achieve the desired coverage.

The present invention provides an attachment assembly for use with a portable hand-held air blower, wherein the attachment assembly utilizes the blower discharge air stream to provide a source of pressurized air and a source of vacuum which cooperatively entrain fertilizer for flow into the blower discharge air stream at an adjustable and substantially uniform flow rate.

SUMMARY OF THE INVENTION

In accordance with the invention, a fertilizer spreader comprises an attachment assembly for use with a portable hand-held air blower having a motor-driven impeller for supplying a relatively high velocity discharge air stream through a discharge outlet formed in a blower housing. The attachment assembly comprises an adapter nozzle for connection in-line with the discharge air stream and configured to supply a source of pressurized air and a source of vacuum to a pneumatic mixer assembly within a portable container filled with a supply of fertilizer or the like. The pressurized air and the vacuum source cooperate to at least partially fluidize a localized region of fertilizer particles within the container and to draw the fluidized particles into the adapter nozzle where they are entrained with the blower discharge air stream for broadcast projection outwardly from the blower.

In one preferred embodiment of the invention, the portable fertilizer-receiving container comprises a relatively lightweight plastic housing including an access opening through which granular fertilizer or the like can be poured into the container. A perforated strainer cup is seated within the access opening to require breakage of any clumps of fertilizer particles prior to entry into the container, and a removable cap is provided for closing the access opening after filling. A shoulder strap or the like is secured to the container to permit the container to be carried about along with the hand-held portable air blower during use.

The container is configured with an angularly disposed bottom wall to cause gravity-feeding of the fertilizer particles toward one end of the container into association with the pneumatic mixer assembly. This pneumatic mixer assembly includes a pressure tube for connection via a suitable pressure conduit to a pressure port on the adapter nozzle through which a relatively small portion of the blower discharge air stream is extracted for flow into the container. The pneumatic mixer assembly further includes an outlet or suction tube for connection via a suitable suction conduit to a vacuum port on the adapter nozzle which opens into a Venturi throat in the nozzle downstream of the pressure port to provide the source of vacuum.

The pressure tube of the pneumatic mixer assembly couples the pressurized air stream to an upwardly open diffuser positioned substantially at the bottom of the fertilizer container. This diffuser divides the air stream into a plurality of upwardly directed air flows which turbulently agitate the fertilizer particles to create partial and localized fluidization of the particles in the region immediately above the diffuser. The fluidized, suspended fertilizer particles are drawn upwardly by the vacuum into the closely adjacent open end of the suction tube for passage through the suction conduit and into the adapter nozzle at the Venturi throat for entrainment with the blower discharge air stream. Importantly, the open end of the suction tube opens downwardly within the container to prevent fertilizer particles from pouring into the suction tube when the container is tipped.

Control of the flow rate of the fertilizer particles is achieved by adjusting the size of a bleed hole in the suction tube to adjustably select the magnitude of vacuum applied to the suspended particles within the container. A rotatable adjustment collar is carried about the suction tube, and this collar has a recess formed therein bounded by an arcuate surface whereby the size of the bleed hole open to external air is selected by rotating the adjustment collar about the suction tube. Importantly, the collar and the bleed hole are positioned relative to each other to prevent full closure of the bleed hole. This assures that a supply of air is available at all times for passage through the suction tube to help prevent clogging of the suction tube during use.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 5 is an enlarged fragmented vertical section of a portion of the container to illustrate operation of the pneumatic mixer assembly;

FIG. 6 is an enlarged fragmented vertical section of the adapter nozzle to illustrate internal construction details thereof;

FIG. 7 is an enlarged fragmented vertical section taken generally on the line 7—7 of FIG. 6;

FIG. 8 is an enlarged fragmented horizontal section taken generally on the line 8—8 of FIG. 2; and FIG. 9 is an enlarged fragmented perspective view illustrating an adjustment collar for controlling the flow rate of fertilizer from the container.

DETAILED DESCRIPTION OF THE PREFERRED EMBODIMENT

A fertilizer spreader 10 is illustrated in the exemplary drawings in the form of an attachment assembly 12 for use with a portable hand-held air blower 14. The attachment assembly is designed for utilizing a relatively small portion of a high velocity discharge air stream provided by the blower 14 for entraining and injecting particulate matter, such as granular fertilizer, into the blower discharge air stream for broadcasting outwardly over a lawn or garden area or the like.

The fertilizer spreader 10 of this invention comprises a relatively inexpensive and simplified apparatus for use in broadcasting particulate material having a particle size ranging from relatively fine powders to relatively coarse granules. The spreader is adjustable to accommodate the specific type of material used and to select a substantially uniform material flow rate without significant risk of clogging during use. The particulate material is projected, as in the case of a typical granular fertilizer, over a relatively large broadcast radius of up to twenty feet or more to permit the user to fertilize a lawn or garden area quickly and easily and with minimum back-and-forth walking movement.

Figure 1:
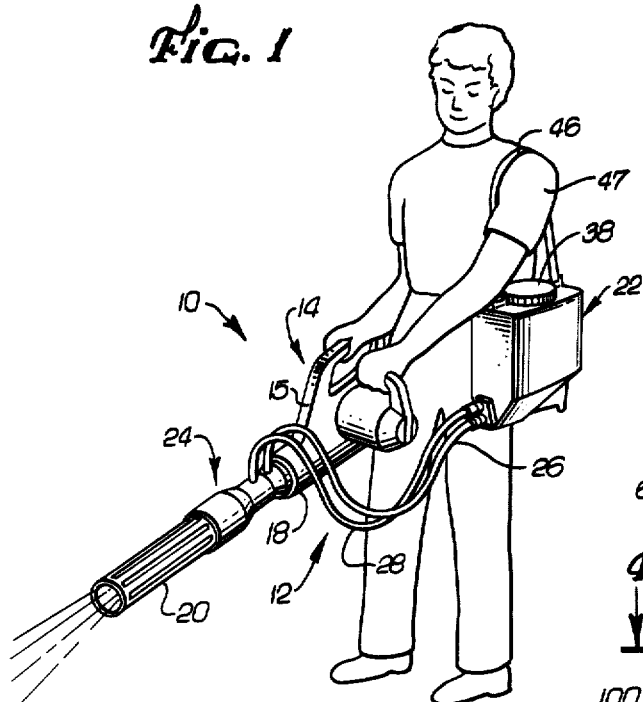
FIG. 1 is a perspective view illustrating the fertilizer spreader of this invention comprising an attachment assembly including a portable container for receiving fertilizer and an adapter nozzle for use with a portable hand-held air blower.
Figure 2:
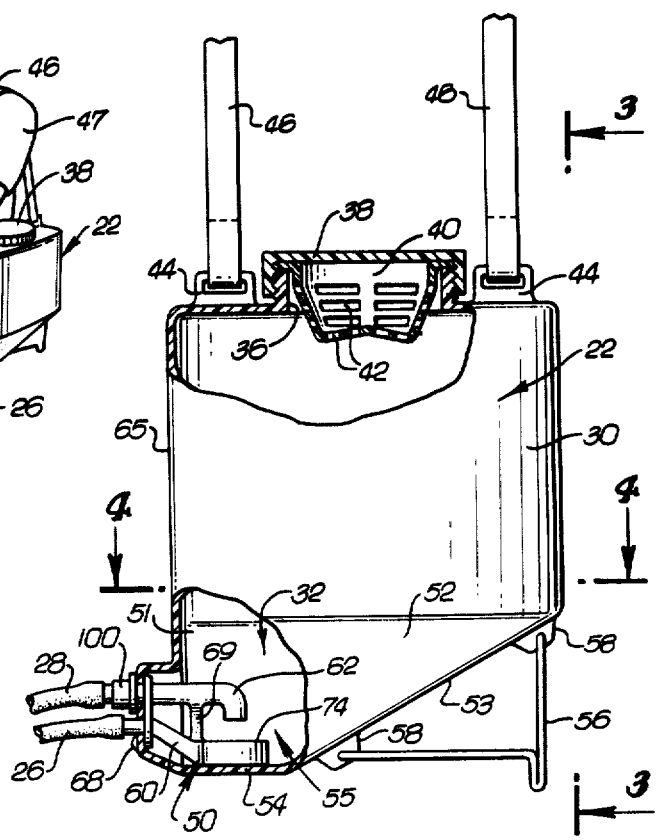
FIG. 2 is an enlarged side elevation view showing the portable container for receiving fertilizer or the like, with portions broken away to illustrate a pneumatic mixer assembly for entraining the fertilizer with an air flow stream.
Figure 3:
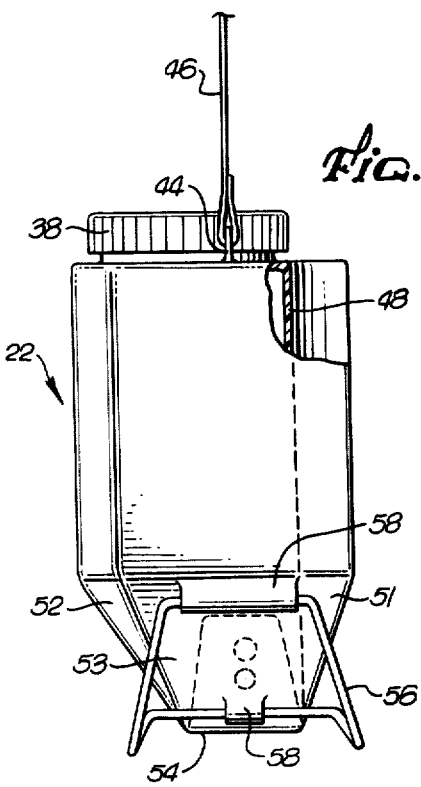
FIG. 3 is a rear elevation view of the container taken generally on the line 3—3 of FIG. 2 to illustrate further construction details thereof.
Figure 4:
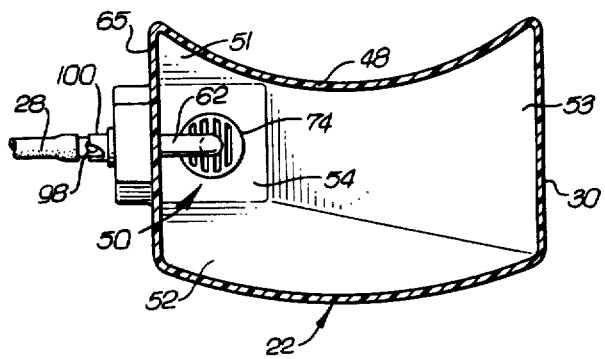
FIG. 4 is a horizontal section taken generally on the line 4—4 of FIG. 2.

The fertilizer spreader 10 is advantageously provided in the form of a kit or attachment assembly 12 for use with a conventional hand-held portable air blower of the type commonly used in domestic lawn and garden applications for blowing dirt and/or leaves from sidewalks or the like. More particularly, with reference to FIG. 1, the blower 14 includes an impeller (not shown) encased within a relatively lightweight portable housing 15 of plastic or the like. The impeller is driven by a motor (also not shown), such as a gasoline or electric motor, to draw ambient air into the housing 15 and to discharge the air from the housing through a discharge outlet 18 at a relatively high velocity and flow rate. In many applications, the length of this discharge outlet 18 is extended by an extender tube 20 to permit more accurate directing of the discharge air stream in a manner generally known in the art.

While the blower 14 can be used for a variety of lawn and garden purposes, the attachment assembly 12 comprises a relatively simple and inexpensive structure for enabling the blower to be used as an integral portion of the fertilizer spreader 10 of this invention. This attachment assembly, as viewed in detail in FIGS. 2-9, comprises a container 22 for receiving a supply of fertilizer, and an adapter nozzle 24 which is mounted in-line with the blower discharge air stream. The adapter nozzle 24 is connected to the container 22 by a pair of flexible conduits 26 and 28 for use in the controlled transfer of the fertilizer from the container 22 to the adapter nozzle 24. In the adapter nozzle 24, the fertilizer is injected into the blower discharge air stream which propels the fertilizer outwardly, as viewed in FIG. 1, for broadcasting over a substantial area of a lawn or garden.

The container 22 is shown in more detail in FIGS. 2-5 and comprises a relatively lightweight and substantially enclosed housing 30 which is preferably formed from a molded plastic or the like. This housing 30 has a hollow interior 32 for receiving a supply of fertilizer 34, such as granular fertilizer particles of the type commonly used in domestic lawn and garden applications. This fertilizer 34 is placed within the housing as by pouring through an upper access opening 36 which is closed after filling of the container by a threaded cap 38. Importantly, a strainer cup 40 having relatively large perforations 42 formed therein is seated within the access opening 36 to prevent entry of clumps of fertilizer into the container 22 without first breaking the clumps into small pieces which can be transferred to the adapter nozzle 24, as will be described in more detail. Alternatively, if desired, the strainer cup 40 can be replaced by other perforated structure, such as, for example, a relatively open mesh screen extending across the access opening 36.

The fertilizer container 22 is advantageously designed to facilitate carrying during use without interfering with control and operation of the blower 14. In this regard, the container is molded to include upwardly projecting slotted tabs 44 positioned generally on opposite sides of the access opening 36 for connection to a flexible shoulder strap 46. Accordingly, when the container 22 is filled with fertilizer, the container is easily carried by the user, as viewed in FIG. 1, with the strap 46 wrapped over the user's shoulder 47. Moreover, the container 22 is advantageously molded or shaped to have a concave upstanding wall 48 on the inboard side thereof, as viewed in FIG. 4, generally to fit matingly against the user's hip. With this construction, the container 22 is comfortably carried without substantial swinging movement to permit the user to operate the blower 14 with both hands in a normal manner.

The bottom of the container 22 is contoured for gravity-feeding of fertilizer continuously toward a pneumatic mixer assembly 50 which is positioned within the container generally at the lower front thereof and which operates to transfer fertilizer particles to the adapter nozzle 24. More specifically, as shown best in FIGS. 2–4, the container 22 includes lower side wall portions 51 and 52 which angle downwardly toward each other and a lower rear wall portion 53 which slopes downwardly and forwardly toward the front of the container. These sloping wall portions 51–53 merge near the front of the container with a bottom wall 54 of relatively small surface area to define a recessed well 55 in which the pneumatic mixer assembly 50 is mounted. Conveniently, a support stand 56 of wire or the like is secured to flanges 58 on the rear wall portion 53 to permit the container to stand upright on a flat surface during filling with fertilizer.

The pneumatic mixer assembly 50 comprises a pressure tube 60 and a suction tube 62 projecting respectively through a pair of vertically spaced openings 63 and 64 formed in a front wall 65 of the container adjacent the well 55. These two tubes 60 and 62 are conveniently joined to a common flange 66 which is secured to the container by a plurality of mounting screws 68 or the like. Moreover, the tubes 60 and 62 are maintained in a predetermined and relatively close vertical spacing with respect to each other by a spacer bridge 69.

As shown in FIG. 5, the pressure tube 60 extending through the lower opening 63 is coupled to the flexible conduit 26 through which a supply of air under pressure is obtained from the adapter nozzle 24. This supply of pressurized air, illustrated by the arrows 70, passes through the pressure tube 60 into a generally cylindrical plenum chamber 72 within a hollow disk 74 which rests upon the bottom wall 54 of the container. From the plenum chamber 72, the pressurized air is turned upwardly for flow through a diffuser 75 defined by a plurality of transversely extending spaced strips 76. Importantly, the diffuser 75 divides the pressurized air into a plurality of relatively small and turbulent air flows which violently agitate the fertilizer particles in a localized region 77 disposed directly above the diffuser, as illustrated by arrows 78. This localized agitation of the particles converts the otherwise-packed particles into a localized region of suspended of partially fluidized particles which are easily drawn from the container for passage to the adapter nozzle 24.

The suction tube 62 extending through the upper opening 64 in the container 22 is coupled to the other flexible conduit 28 to which a source of vacuum is applied from the adapter nozzle 24. This suction tube 62 and the associated conduit 28 are conveniently formed to have a size different from the pressure tube 60 and the conduit 26 to prevent undesired cross-coupling of the conduits. Within the container, the suction tube 62 has an open end 80 oriented for coupling the vacuum to the localized region 77 of suspended and fluidized fertilizer particles. Accordingly, the fluidized fertilizer particles are drawn by the vacuum and blown by the pressurized air within the region 77 into and through the suction tube 62 as shown by arrows 71 for passage through the conduit 28 to the adaptor nozzle 24. Importantly, as viewed best in FIG. 5, the open end 80 of the suction tube 62 is advantageously turned within the container to open downwardly toward the fluidized region or fertilizer particles in order to prevent particles from pouring into the suction tube 62 when the container is tipped slightly during use.

One preferred construction for the adapter nozzle 24 for providing a source of pressurized air to the pressure tube 60 and a source of vacuum to the suction tube 62 is shown in detail in FIGS. 6–8. As illustrated, the adapter nozzle 24 comprises a generally tubular body of molded plastic or the like to have an upstream end 82 adapted to fit snugly within the discharge outlet 18 of the blower 14 and a downstream end 84 adapted to fit snugly over the end of a conventional extender tube 20. Accordingly, the adapter nozzle 24 is mounted in-line with the discharge air stream from the blower 14 for substantially uninterrupted passage of the discharge air stream.

A relatively small portion of the discharge air stream is diverted within the adapter nozzle 24 to provide the source of pressurized air. More specifically, a support structure 86 formed integrally with the adapter nozzle 24 projects with a relatively narrow profile into the path of the discharge air stream and includes a pressure port 88 positioned generally along a central axis 89 of the nozzle to open in an upstream direction for receiving a portion of the discharge air stream. This portion of the air stream passing into the pressure port is diverted into an upwardly extending outlet port 90 sized for connection to the flexible conduit 26 for supplying the pressurized air to the pressure tube 60 within the fertilizer container 22.

The vacuum source is provided by shaping the adapter nozzle 24 to include a Venturi throat 92 of narrowed cross section in combination with a vacuum port 94 opening in a downstream direction within the Venturi throat. This vacuum port 94 is conveniently formed as part of the support structure 86 and opens into an upstanding inlet port 96 sized for connection to the other flexible conduit 28. Accordingly, a vacuum is applied through the flexible conduit 28 to the suction tube 62 within the container 22 to draw fertilizer particles from the container into the adapter nozzle. As the fertilizer particles enter the adapter nozzle, the particles are directed in a downstream direction into the discharge air stream generally along the axis 89 for entrainment with the air stream. The fertilizer particles are thus carried out of the adapter nozzle 24 and through the extender tube 20 for projection and broadcast outwardly over a prescribed area of a lawn or garden.

The flow rate of fertilizer particles from the container 22 to the adapter nozzle 24 is selected and adjustably controlled by varying the size of a bleed hole 98 formed in the suction tube 62 at a position located outside the container 22. This bleed hole 98, as viewed best in FIG. 9, is selectively closed to a desired degree by rotation of an adjustment collar 100 about the suction tube 62. This rotation collar is shaped to include an enlarged cutout or recess 102 defined on one side by an arcuately extending edge 104 whereby rotation of the collar 100 about the suction tube displaces the arcuate edge 104 with respect to the bleed hole 98 for selected and accurate variation of the area of the bleed hole open to external or ambient air.

In operation, ambient air is drawn into the bleed hole 98 in an amount related to the rotational position of the adjustment collar 100 to control the magnitude of the vacuum applied to the fluidized region 77 of fertilizer particles within the container. More particularly, full exposure of the bleed hole 98 to external air results in a substantial reduction in the vacuum applied to the particles whereas partial closure of the bleed hole 98 results in an increase in the vacuum applied to the particles. In actual use of the invention, the bleed hole 98 is fully exposed when the fertilizer particles are small or lightweight, such as a powder, or when a relatively low flow rate of particles is desired. Conversely, the bleed hole is partially closed to a selected degree when the fertilizer particles are larger, such as common fertilizer granules, or when an increased flow rate of particles is desired. In any event, the bleed hole 98 is desirably positioned within the suction tube 62 to prevent full closure by the collar 100 so that at least some external air is drawn through the conduit 28 to the adapter nozzle 24 for all conditions of operation. This maintains air flow through the conduit 28 relatively high at all times to correspondingly maintain a relatively high air velocity in the suction tube 62 for minimizing risk of clogging of the tube.

The present invention thus provides a simplified and inexpensive fertilizer spreader 10 for use with a variety of fertilizers and other substances of different particle size, wherein entrainment of the particles into the discharge air stream of a blower is substantially uniform and adjustable without significant opportunity for clogging. The invention is embodied in the form of an attachment assembly for use with a common hand-held portable blower. The attachment assembly includes an adapter nozzle 24 for easy mounting in-line with the blower discharge air stream and for connection with a fertilizer container 22 via a pair of flexible conduits 26 and 28. After use, the attachment assembly is quickly and easily disassembled from the blower to permit use of the blower for other purposes.

A variety of modifications and improvements to the invention described herein are believed to be apparent to one skilled in the art. Accordingly, no limitation on the invention is intended, except as set forth in the appended claims.

What is claimed is:

1. Apparatus for entraining particulate material within a discharge air stream of an air blower, comprising:
   - an adapter nozzle having a Venturi throat formed therein for passage of the discharge air stream;
   - a container for receiving a supply of the particulate material;
   - first means including a pressure tube extending into said container for coupling a portion of the discharge air stream to the interior of said container and a diffuser for separating said air stream portion into a plurality of relatively turbulent air flows for agitating and fluidizing a localized region of the particulate material within said container; and
   - second means including a suction tube extending into said container and terminating with an open end disposed generally adjacent said localized region for coupling said localized region to said Venturi throat for drawing of the fluidized particulate material from said container into said adapter nozzle for entrainment with the discharge air stream.

2. Apparatus as set forth in claim 1 wherein the blower comprises a portable housing having an impeller therein for generating the discharge air stream, said adapter nozzle being for mounting on said housing for generally in-line passage of the discharge air stream.

3. Apparatus as set forth in claim 1 wherein the blower and said container are portable.

4. Apparatus as set forth in claim 3 including a shoulder strap secured to said container.

5. Apparatus as set forth in claim 1 wherein said container comprises a housing having an access opening formed therein to permit filling thereof with the particulate material, a removable cap for closing said access opening, and perforate means extending across said access opening for preventing passage of clumps of particulate material into said housing prior to breakage of said clumps into pieces sufficiently small for passage through said perforate means.

6. Apparatus as set forth in claim 5 wherein said perforate means comprises a strainer cup seated within said access opening.

7. Apparatus as set forth in claim 1 wherein said first means comprises a pressure port formed in said adapter nozzle for diverting a portion of the discharge air stream, said pressure tube extending from outside said container to a position within said container, and conduit means coupled between said pressure port and said pressure tube.

8. Apparatus as set forth in claim 1 including a vacuum port formed in said adapter nozzle to open into said Venturi throat, and conduit means coupled between said suction tube and said vacuum port.

9. Apparatus as set forth in claim 1 wherein said diffuser is positioned generally at the bottom of said container and is oriented for directing said turbulent air flows generally upwardly.

10. Apparatus as set forth in claim 9 wherein said open end of said suction tube opens generally in a downward direction toward said localized region of particulate material.

11. Apparatus as set forth in claim 10 wherein said suction tube extends generally upwardly from said open end and turns generally horizontally for passage from said container.

12. Apparatus as set forth in claim 10 wherein said suction tube and said diffuser are vertically spaced from and open generally toward each other.

13. Apparatus as set forth in claim 1 including means for controlling the flow rate of particulate material drawn from said container.

14. Apparatus as set forth in claim 13 wherein said control means comprises a bleed hole formed in said suction tube at a position outside said container, and adjustment means for selectively controlling the area of said bleed hole exposed to ambient air.

15. Apparatus for entraining particulate material within a discharge air stream of an air blower, comprising:
   - an adapter nozzle for passage of the discharge air stream;
   - a container for receiving a supply of the particulate material; and
   - pneumatic mixing means for agitating and fluidizing a localized region of the particulate material within said container and for drawing the fluidized particulate material from said container into said adapter nozzle for entrainment with the discharge air stream, said pneumatic mixing means including a pressure tube extending into said container and having an open end within said container opening generally in an upward direction, means for supplying a source of pressurized air for passage through said pressure tube into said container for agitating and fluidizing the localized region of particulate material, a suction tube extending into said container and having an open end disposed generally adjacent said localized region and presented generally in a downward direction in vertical alignment with the open end of said pressure tube, and means for coupling a vacuum to said suction tube for drawing the particulate matter from said localized region out of said container.

16. Apparatus as set forth in claim 15 wherein said container comprises a housing having an access opening formed therein to permit filling thereof with the particulate material, a removable cap for closing said access opening, and perforate means extending across said access opening for preventing passage of clumps of particulate material into said housing prior to breakage of said clumps into pieces sufficiently small for passage through said perforate means.

17. Apparatus as set forth in claim 15 including means for controlling the flow rate of particulate material drawn from said container.

18. Apparatus as set forth in claim 15 wherein said means for supplying the pressurized air source to said pressure tube comprises a pressure port formed within said adapter nozzle for diverting a portion of the discharge air stream flowing therethrough, and conduit means for coupling said diverted air stream portion to said pressure tube.

19. Apparatus as set forth in claim 18 wherein said adapter nozzle has a Venturi throat formed therein, and wherein said means for coupling the vacuum to said suction tube comprises a vacuum port formed within said adapter nozzle to open into said Venturi throat, and conduit means for coupling said vacuum port to said suction tube.

20. Apparatus as set forth in claim 19 wherein said vacuum port opens in a downstream direction within said Venturi throat.

21. Apparatus as set forth in claim 19 wherein said pressure port is formed in said adapter nozzle at a position upstream of said Venturi throat.

22. Apparatus as set forth in claim 1 wherein said open end of said pressure tube includes a diffuser for dividing said pressurized air into a plurality of relatively turbulent air flows directed generally toward said localized region of particulate material.

23. Apparatus as set forth in claim 15 including means for predeterminably spacing said pressure tube and said suction tube with respect to each other and for mounting said pressure tube and said suction tube on said container.

24. Apparatus as set forth in claim 15 wherein said suction tube has a bleed hole formed therein at a position outside said container, and including an adjustment collar carried about said suction tube and having a recess formed therein for overlapping alignment with said bleed hole, said adjustment collar being rotatable about said suction tube to vary the alignment between said recess and said bleed hole for selective closure of the area of said bleed hole open to ambient air.

25. Apparatus as set forth in claim 24 wherein said collar is positioned about said suction tube at a longitudinal position with respect to said bleed hole to prevent complete closure of said bleed hole.

26. Apparatus as set forth in claim 15 wherein said pneumatic mixing means is positioned within said container generally at the bottom thereof, said container including generally upstanding end walls and side walls configured for gravity-feeding of the particulate material toward said pneumatic mixing means.

27. Apparatus for entraining particulate material within a discharge air stream of an air blower, comprising:
an adapter nozzle having a Venturi throat formed therein for passage of the discharge air stream;
a container for receiving a supply of the particulate material;
a pneumatic mixer assembly mounted generally within the bottom of said container and including a pressure tube having a diffuser at an open end thereof opening generally upwardly toward a localized region of the particulate material, said mixer assembly further including a suction tube having an open end positioned generally in spaced vertical alignment with said diffuser and opening generally downwardly toward said localized region;
means for diverting a portion of the discharge air stream from said adapter nozzle for passage into said pressure tube for direction upwardly through said diffuser to agitate and fluidize the particulate material within said localized region; and
means for coupling said suction tube to said Venturi throat of said adapter nozzle for applying a vacuum to said localized region to draw the fluidized particulate material into said adapter nozzle for entrainment with the discharge air stream.

28. Apparatus as set forth in claim 27 wherein said means for diverting a portion of the discharge air stream comprises a pressure port formed in said adapter nozzle upstream of said Venturi throat, and a pressure conduit coupled between said pressure port and said pressure tube.

29. Apparatus as set forth in claim 28 wherein said means for applying the vacuum comprises a vacuum port formed in said adapter nozzle to open into said Venturi throat, and a vacuum conduit coupled between said vacuum port and said suction tube.

30. Apparatus as set forth in claim 29 wherein said pressure port and said pressure tube are sized for coupling with said pressure conduit, and wherein said vacuum port and said suction tube are sized for coupling with said vacuum conduit, said pressure conduit and said vacuum conduit being of different sizes.

31. Apparatus as set forth in claim 27 wherein said suction tube has a bleed hole formed therein at a position outside said container, and including an adjustment collar carried about said suction tube and having a recess formed therein for overlapping alignment with said bleed hole, said adjustment collar being rotatable about said suction tube to vary the alignment between said recess and said bleed hole for selective closure of the area of said bleed hole open to ambient air.

32. An attachment assembly for entraining particulate fertilizer or the like within a discharge air stream of an air blower comprising:
an adapter nozzle having a Venturi throat formed therein for passage of the discharge air stream;
a container for receiving a supply of the fertilizer;
a pneumatic mixer assembly mounted generally within the bottom of said container and including a pressure tube having a diffuser at an open end thereof opening generally upwardly toward a localized region of the fertilizer, said mixer assembly further including a suction tube having an open end positioned generally in spaced vertical alignment with said diffuser and opening generally downwardly toward said localized region;

means for diverting a portion of the discharge air stream from said adapter nozzle for passage into said pressure tube for direction upwardly through said diffuser to agitate and fluidize the fertilizer within said localized region;

means for coupling said suction tube to said Venturi throat of said adapter nozzle for applying a vacuum to said localized region to draw the fluidized particulate material into said adapter nozzle for entrainment with the discharge air stream; and means for adjustably controlling the flow of fertilizer drawn from said container, said controlling means including an adjustment collar carried about said suction tube at a position outside said container and movable for selectively closing a bleed hole formed in said suction tube to vary the area of said bleed hole exposed to ambient air.

33. The attachment assembly of claim 32 wherein said container comprises a housing having an access opening formed therein to permit filling thereof with the fertilizer, a removable cap for closing said access opening, and perforate means extending across said access opening for preventing passage of clumps of fertilizer into said housing prior to breakage of said clumps into pieces sufficiently small for passage through said perforate means.

34. The attachment assembly of claim 32 including means for preventing movement of said adjustment collar for complete closure of said bleed hole.

35. The attachment assembly of claim 32 wherein said adjustment collar is rotatable about said suction tube and has a recess formed therein for selective overlapping alignment with said bleed hole, said adjustment collar being positioned on said suction tube at a longitudinal position with respect to said bleed hole to prevent complete closure of said bleed hole.

36. An attachment assembly for use with a portable hand-held air blower having means for providing a discharge air stream through a discharge outlet formed in a blower housing, said attachment assembly comprising:

an adapter nozzle for mounting on the blower housing for in-line passage of the discharge air stream, said adapter nozzle having a Venturi throat formed therein;

a portable container for receiving a supply of particulate fertilizer or the like, said container including means adapted to permit carrying thereof without substantially interferring with operation and use of the blower;

a pneumatic mixer assembly mounted generally within the bottom of said container and including a pressure tube having a diffuser at an open end thereof opening generally upwardly toward a localized region of the fertilizer, said mixer assembly further including a suction tube having an open end positioned generally in spaced vertical alignment with said diffuser and opening generally downwardly toward said localized region;

means for diverting a portion of the discharge air stream from said adapter nozzle for passage into said pressure tube for direction upwardly through said diffuser to agitate and fluidize the fertilizer within said localized region; and means for adjustably controlling the flow of fertilizer drawn from said container, said controlling means including an adjustment collar carried about said suction tube at a position outside said container and movable for selectively closing a bleed hole formed in said suction tube to vary the area of said bleed hole exposed to ambient air.

37. The attachment assembly of claim 36 wherein said means adapted to permit carrying of said container comprises a shoulder strap.

38. A fertilizer spreader for entraining particulate material into a relatively high velocity air stream, comprising:

a portable blower including a housing having a discharge outlet formed therein and means within said housing for providing a relatively high velocity discharge air stream for passage through said discharge outlet;

an adapter nozzle for in-line passage of the discharge air stream, said nozzle having a pressure port for diverting a portion of the discharge air stream from said nozzle, a Venturi throat downstream of said pressure port, and a vacuum port opening into said Venturi throat;

a portable container for receiving a supply of the particulate material;

a pneumatic mixer assembly mounted generally within the bottom of said container and including a pressure tube having a diffuser at an open end thereof opening generally upwardly toward a localized region of the particulate material, said mixer assembly further including a suction tube having an open end positioned generally in spaced vertical alignment with said diffuser and opening generally downwardly toward said localized region;

a first conduit for coupling said pressure port to said pressure tube for direction upwardly through said diffuser to agitate and fluidize the particulate material within said localized region;

a second conduit for coupling said vacuum port to said suction tube for applying a vacuum to said localized region to draw the fluidized particulate material into said adapter nozzle for entrainment with the discharge air stream; and means for adjustably controlling the flow of particulate material drawn from said container, said controlling means including an adjustment collar carried about said suction tube at a position outside said container and movable for selectively closing a bleed hole formed in said suction tube to vary the area of said bleed hole exposed to ambient air.

39. The fertilizer spreader of claim 38 wherein said container comprises a housing having an access opening formed therein to permit filling thereof with the particulate material, a removable cap for closing said access opening, and perforate means extending across said access opening for preventing passage of clumps of particulate material into said housing prior to breakage of said clumps into pieces sufficiently small for passage through said perforate means.

* * * * *